(12) United States Patent
Zong et al.

(10) Patent No.: US 10,848,793 B2
(45) Date of Patent: Nov. 24, 2020

(54) CONFIGURING METHOD AND APPARATUS FOR SPLICING-TYPE DISPLAY DEVICE, AND DISPLAY DEVICE CONTROL CARD

(71) Applicant: Xi'an NovaStar Tech Co., Ltd., Xi'an (CN)

(72) Inventors: Jingguo Zong, Xi'an (CN); Huorong Wang, Xi'an (CN); Wei Liang, Xi'an (CN)

(73) Assignee: XI'AN NOVASTAR TECH CO., LTD., Xi'an (CN)

( * ) Notice: Subject to any disclaimer, the term of this patent is extended or adjusted under 35 U.S.C. 154(b) by 0 days.

(21) Appl. No.: 16/595,628

(22) Filed: Oct. 8, 2019

(65) Prior Publication Data

US 2020/0037011 A1    Jan. 30, 2020

Related U.S. Application Data

(63) Continuation of application No. PCT/CN2017/101298, filed on Sep. 11, 2017.

(30) Foreign Application Priority Data

May 10, 2017    (CN) .......................... 2017 1 0326614

(51) Int. Cl.
   *H04N 21/234*    (2011.01)
   *G06F 3/14*      (2006.01)
   *G11B 27/036*    (2006.01)

(52) U.S. Cl.
   CPC ..... *H04N 21/23424* (2013.01); *G06F 3/1446* (2013.01); *G11B 27/036* (2013.01)

(58) Field of Classification Search
   CPC ............ G06F 3/1446; G09G 2300/026; G09G 2340/14; G09G 2356/00; G09G 2370/04;
   (Continued)

(56) References Cited

U.S. PATENT DOCUMENTS

2005/0174314 A1* 8/2005 Furihata ................... G09G 5/40
                                                             345/98
2008/0024387 A1* 1/2008 Maskeny .............. G09F 9/3026
                                                            345/1.1

(Continued)

*Primary Examiner* — Hong Zhou
(74) *Attorney, Agent, or Firm* — Hemisphere Law, PLLC; Zhigang Ma (57) ABSTRACT

The application provides a configuring method for a splicing-type display device, the configuring method includes: receiving a configuration information display command; in response to the configuration information display command, extracting fonts from a font library according to configuration information and stitching the extracted fonts to thereby generate a configuration information image, wherein the configuration information includes driving port information and a cascading serial number, and the configuration information image at least includes the cascading serial number; storing the configuration information image; embedding the stored configuration information image into a background image corresponding to a driven display area to thereby obtain a target image; and displaying the target image in the driven display area. The application further provides a configuring apparatus and a display device control card adapted for performing the configuring method.

15 Claims, 6 Drawing Sheets

(58) Field of Classification Search
CPC ........... G11B 27/036; H04N 21/23424; H04N 21/4312; H04N 21/8153
See application file for complete search history.

(56) References Cited

U.S. PATENT DOCUMENTS

| | | | |
|---|---|---|---|
| 2011/0164065 A1* | 7/2011 | Mate | G06F 3/1446 345/676 |
| 2014/0313101 A1* | 10/2014 | Chen | G06F 3/1446 345/1.3 |
| 2016/0062725 A1* | 3/2016 | Odagiri | G06F 3/1446 345/1.3 |
| 2016/0224306 A1* | 8/2016 | Rycyna, III | G06F 3/1446 |
| 2016/0275835 A1* | 9/2016 | Yuan | G09F 9/35 |
| 2016/0300549 A1* | 10/2016 | Zhang | G06F 3/1446 |
| 2016/0328202 A1* | 11/2016 | Ritter | G06F 3/1446 |
| 2017/0018260 A1* | 1/2017 | Li | G09G 3/3208 |
| 2017/0024179 A1* | 1/2017 | Terao | G06F 3/1438 |
| 2018/0267758 A1* | 9/2018 | Zhao | G06T 3/0068 |

\* cited by examiner

| P. 01 #001 | P. 01 #002 | P. 01 #003 | P. 01 #004 | P. 01 #005 |
|---|---|---|---|---|
| P. 01 #010 | P. 01 #009 | P. 01 #008 | P. 01 #007 | P. 01 #006 |
| P. 01 #011 | P. 01 #012 | P. 01 #013 | P. 01 #014 | P. 01 #015 |
| P. 02 #001 | P. 02 #002 | P. 02 #003 | P. 02 #004 | P. 02 #005 |
| P. 02 #010 | P. 02 #009 | P. 02 #008 | P. 02 #007 | P. 02 #006 |
| P. 02 #011 | P. 02 #012 | P. 02 #013 | P. 02 #014 | P. 02 #015 |

FIG. 4

| P. 01 #001 | P. 01 #002 | P. 01 #003 | P. 01 #004 | P. 01 #005 |
|---|---|---|---|---|
| P. 01 #010 | P. 01 #009 | P. 01 #008 | P. 01 #007 | P. 01 #006 |
| P. 01 #011 | P. 01 #012 | P. 01 #013 | P. 01 #014 | P. 01 #015 |
| P. 02 #001 | P. 02 #002 | P. 02 #003 | P. 02 #004 | P. 02 #005 |
| P. 02 #010 | P. 02 #009 | P. 02 #008 | P. 02 #007 | P. 02 #006 |
| P. 02 #011 | P. 02 #012 | P. 02 #013 | P. 02 #014 | P. 02 #015 |

CONFIGURING METHOD AND APPARATUS FOR SPLICING-TYPE DISPLAY DEVICE, AND DISPLAY DEVICE CONTROL CARD

FIELD OF THE DISCLOSURE

The disclosure relates to a technical field of display, and more particularly to a configuring method for a splicing-type display device, a display device control card and a configuring apparatus for a splicing-type display device.

BACKGROUND

Nowadays, light emitting diode (LED) display devices have gained more and more market attentions because of their properties of high dynamics and high color saturation. More and more advertisers and merchants prefer to choose LED display devices as mediums for advertising. However, the cost and maintenance of large outdoor display devices have made some customers discouraged, but the emergence of display device rental companies has solved this problem. The area of the outdoor display device for advertising has been further expanded, and the prosperity of the display device rental market has brought new opportunities and challenges to a display device control system. The rental display device is generally large, a number of cabinets are needed and connected in cascade, and connection and configuration of the cabinets have become a complicated and cumbersome work.

In the process of connection and configuration for display devices, as to a display device with a simple connection, users should correctly fill in a sending card serial number, a network port serial number, a receiving card serial number, a starting X coordinate, a starting Y coordinate, and width and height of an display area driven by each receiving card, according to actual cabinet layout information, then a software will generate a cabinet connection topology based on the filled information, and finally a screen of the display device can be lit up correctly. For a display device with a complicated connection, a user can route connections among cabinets via software according to actual driving areas of respective cabinets. The user should correctly configure a size of driving area of each cabinet, and then an arrangement of the cabinets in rows and columns based on a total display area of the display device is displayed. The user routes connections of the cabinets through the software, and finally the whole connection in the display device is completed and thereby a screen of the display device can be lit up correctly.

In the process of realizing this disclosure, the inventors have found at least the following problems in the related art that when the screen of the display device is relatively large, connecting and troubleshooting of the cabinets become more complicated, and the users need to fill in much more information. Moreover, during an actual debugging process, if one cabinet is disordered, the other cabinets thereafter will be affected. In addition, the troubleshooting of the cabinets is performed by observing displayed images on the screen of the display device, which would result in the work is cumbersome and the user's experience is affected consequently.

SUMMARY

The disclosure provides a configuring method for a splicing-type display device, a display device control card, and a configuring apparatus for a splicing-type display device, so as to solve the above cumbersome problem associated with the configuration of display device, and realize technical effects of reducing the working time and improving the work efficiency.

The disclosure provides a configuring method for a splicing-type display device, the configuring method comprises: receiving a configuration information display command; in response to the configuration information display command, extracting fonts from a font library according to configuration information and stitching the extracted fonts to thereby generate a configuration information image, wherein the configuration information comprises driving port information and a cascading serial number, and the configuration information image at least comprises the cascading serial number; storing the configuration information image; embedding the stored configuration information image into a background image corresponding to a driven display area to thereby obtain a target image; and displaying the target image in the driven display area.

In one embodiment, the step of extracting fonts from a font library according to configuration information and stitching the extracted fonts to thereby generate a configuration information image comprise: performing a stitching operation on a plurality of extracted fonts in a line-by-line manner.

In one embodiment, the step of embedding the stored configuration information image into a background image corresponding to a driven display area to thereby obtain a target image comprises: replacing data in a local area of the background image by data of the configuration information image to thereby obtain data of the target image.

In one embodiment, the step of replacing data in a local area of the background image by data of the configuration information image to thereby obtain data of the target image comprises: changing a bit number of an image data of each pixel in the configuration information image.

In one embodiment, the step of replacing data in a local area of the background image by data of the configuration information image to thereby obtain data of the target image further comprises: adjusting content of the image data with changed bit number, of each pixel in the configuration information image.

In one embodiment, a resolution of the configuration information image is one selected from preset resolutions, and the preset resolutions comprise 64*64, 96*96, and 128*128.

In one embodiment, the configuration information image further comprises the driving port information and a resolution of the driven display area.

In one embodiment, the background image is a pre-stored monochrome image or pure color image.

The disclosure further provides a display device control card, adapted for connecting with a splicing-type display device; wherein the display device control card is configured for executing the above configuring method.

The disclosure further provides a configuring apparatus for a splicing-type display device, and the configuring device comprises a font library, a fonts stitching module, a storage module, and an image embedding module. The fonts stitching module is configured for extracting fonts from the font library according to configuration information and stitching the extracted fonts to thereby generate a configuration information image, wherein the configuration information comprises driving port information and a cascading serial number, and the configuration information image at least comprises the cascading serial number. The storage module is configured for storing the configuration information image. The image embedding module is configured for embedding the stored configuration information image into a background image corresponding to a driven display area to thereby obtain a target image.

In one embodiment, the image embedding module comprises a data converting sub-module and a data replacing sub-module; the data converting sub-module is configured for changing a bit number of an image data of each pixel in the configuration information image; and the data replacing sub-module is configured for replacing data in a local area of the background image by the image data with changed bit number of each pixel in the configuration information image, to thereby obtain data of the target image.

In one embodiment, the image embedding module comprises a data replacing sub-module and at least one of a data converting sub-module and a data content adjusting sub-module. The data converting sub-module is configured for changing a bit number of an image data of each pixel in the configuration information image. The data content adjusting sub-module is configured for adjusting content of the image data with changed bit number of each pixel in the configuration information image. The data replacing sub-module is configured for replacing data in a local area of the background image by the image data with the changed bit number of each pixel in the configuration information image to thereby obtain data of the target image; or configured for replacing data in a local area of the background image by the image data with adjusted content of each pixel in the configuration information image, to thereby obtain data of the target image.

In one embodiment, the configuration information image further comprises the driving port information and a resolution of the driven display area.

In one embodiment, the fonts splicing module is configured for performing a stitching operation on a plurality of extracted fonts in a line-by-line manner.

In one embodiment, the storage module is configured for storing an image data represented by one bit of each pixel of the configuration information image.

One of the above technical solutions has the following advantages that by issuing the configuration information display command to trigger the generation of the configuration information image and the embedding operation for the configuration information image, and then displaying the configuration information image on the splicing-type display device for observation by users, which provides a quick and effective solution for troubleshooting and configuring splicing units such as the LED cabinets for users, reduces users' cumbersome configuration work, reduces the technical threshold for the users to configure the splicing units, and improves the working efficiency of technicians.

One of the above technical solutions has the following advantages that the display device control card can perform a fast and convenient configuring method for the splicing-type display device, which provides a more convenient and more intuitive connection routing for the display device on aspects of configuration and connection to users, so that it can reduce working time and improve working efficiency when installing, configuring, and troubleshooting the splicing units.

One of the above technical solutions has the following advantages that the configuring apparatus for a splicing-type display device can perform a fast and convenient configuring method for the splicing-type display device, which provides a more convenient and more intuitive connection routing for the display device on aspects of configuration and connection to users, so that it can reduce working time and improve working efficiency when installing, configuring, and troubleshooting the splicing units.

BRIEF DESCRIPTION OF THE DRAWINGS

In order to more clearly illustrate technical solutions of embodiments of the disclosure, drawings used in the embodiments will be briefly introduced below. Apparently, the drawings in the description below are merely some embodiments of the disclosure, a person skilled in the art can obtain other drawings according to these drawings without creative efforts.

DETAILED DESCRIPTION OF EMBODIMENTS

Technical solutions of embodiments of the disclosure will be clearly and fully described in the following with reference to the accompanying drawings in the embodiments of the disclosure. Apparently, the described embodiments are some of the embodiments of the disclosure, but not all of the embodiments of the disclosure. All other embodiments obtained by skilled person in the art without creative efforts based on the described embodiments of the disclosure are within the scope of protection of the instant application.

Embodiment 1

Figure 1:
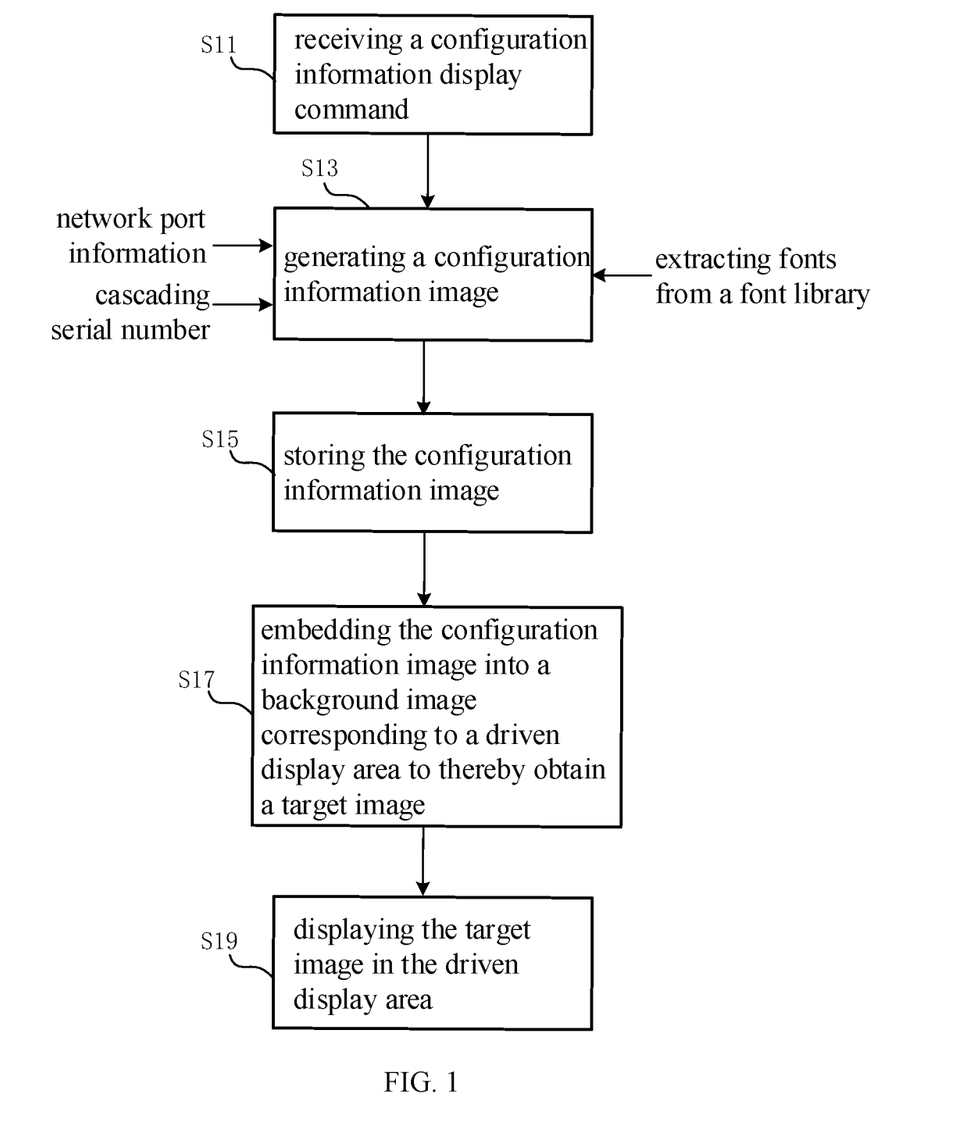
FIG. 1 is a flowchart of a configuring method for a splicing-type display device according to a first embodiment of the disclosure.

As shown in FIG. 1, a first embodiment of the disclosure provides a configuring method for a splicing-type display device, which comprises:

Step S11, receiving a configuration information display command;

Step S13, generating a configuration information image;

Step S15, storing the configuration information image;

Step S17, embedding the configuration information image into a background image corresponding to a driven display area to thereby obtain a target image; and Step S19, displaying the target image in the driven display area.

In order to understand the disclosure more clearly, the foregoing steps S11-S19 are described in detail as follows accompanying with specific examples.

In step S11, the configuration information display command may be generated by a host computer, and is transmitted to a splicing unit of a splicing-type display device such as a display device control card (e.g., a receiving card) of an LED cabinet through a display device controller such as a sending card; the command also may be generated directly by the display device controller for manually triggering a designated button and then transmitted to the receiving card; accordingly, the splicing-type display device of the disclosure is, for example, an LED display device, but the disclosure is not limited thereto.

In step S13, after the receiving card receives the configuration information display instruction, under the trigger control of the configuration information display command, a processing unit of the receiving card such as a programmable logic device (e.g., an FPGA device)extract corresponding fonts from a font library for reorganization and stitching to obtain the configuration information image, according to configuration information such as network port information and a cascading serial number of the LED cabinet. More specifically, after obtaining the configuration information such as the network port information and the cascading serial number, address numbers stored corresponding fonts are selected for handling, the fonts are stitched in a line byline manner, and finally the reorganization of the entire configuration information image is completed. It is worth mentioned here that, the "network port information" of the embodiment is for a display device controller such as a sending card driven by a network port, so in order to include the case of driven by other interfaces, the network port information is just an example of driving port information and is not intended to limit the disclosure.

In the step S15, for example, 1 bit storage represents the image data of one pixel of the configuration information image, 1 'b1 represents that the pixel displays a white image, and 1 'b0 represents that the pixel displays a black image. In this embodiment, a display resolution of the configuration information image is set as three kinds, for examples, 64*64, 96*96, and 128*128, and the effective pixels respectively are 4096, 9216, and 16384, two M9K RAMs are required to store this part of image information.

In the step S17, the stored data of the configuration information image is used to replace the data in a local area of the background image, thereby obtaining the data of the target image. Specifically, in the process of data replacement, the bit number of the image data of each pixel of the read screen configuration information image is changed firstly, for example, the image data 1'b1 of the read pixel is converted into actual use data 32'hffffffff, and the image data 1'b0 of the read pixel is converted into actual use data 32'h00000000. Then, the converted actual use data replaces the image data of the pixel point of the local area of the background image, thereby achieving the purpose of embedding the configuration information image in the background image. In this embodiment, the background image may be pre-stored in the receiving card, for example, the background image maybe a monochrome image such as a red, a green or a blue image, or maybe a solid color image such as a white image; of course, it is also maybe other type image. In addition, the configuration information image can also replace the entire area of the background image, but this will increase the amount of data processing.

Figure 2:
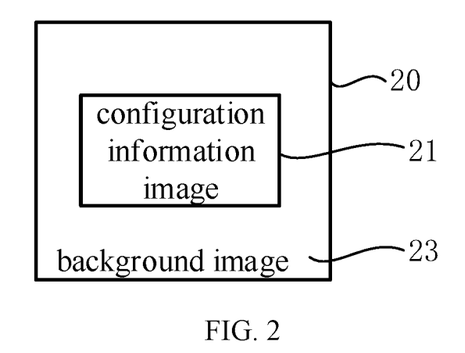
FIG. 2 is a schematic view showing the content of a target image of the first embodiment of the disclosure.

In the step S19, displaying the target image in the driven display area of the receiving card means displaying in a display area of a corresponding LED cabinet of the receiving card. As shown in FIG. 2, a configuration information image 21 exemplarily replaces just a central area of a background image corresponding to a driven display area 20, so the configuration information image 21 is displayed in the central area of the driven display area 20, and an un-replaced portion 23 of the background image is displayed in a periphery area of the driven display area 20, when the target image is displayed.

As described above and as shown in FIG. 3, the configuration information image of the embodiment includes driving port information, such as the network port information and the cascading serial number arranged in two rows; taking the display resolution of configuration information image being 64*64, 96*96, or 128*128 as examples, the network port information consists of four fonts, the first two are exemplarily fixed as "P" and ":", the last two both are selected from numbers of 0 to 9, and each font has a size of 32*16, 48*24, or 64*32. Similarly, the cascading serial numbers also consist of four fonts, the first one is fixed as "#", and the last three each are selected from numbers of 0 to 9, each of the fonts has a size of 32*16, 48*24, or 64*32. Of course, in order to achieve a relatively friendly interface, the configuration information image may further include resolution size information of the driven display area.

Figure 4:
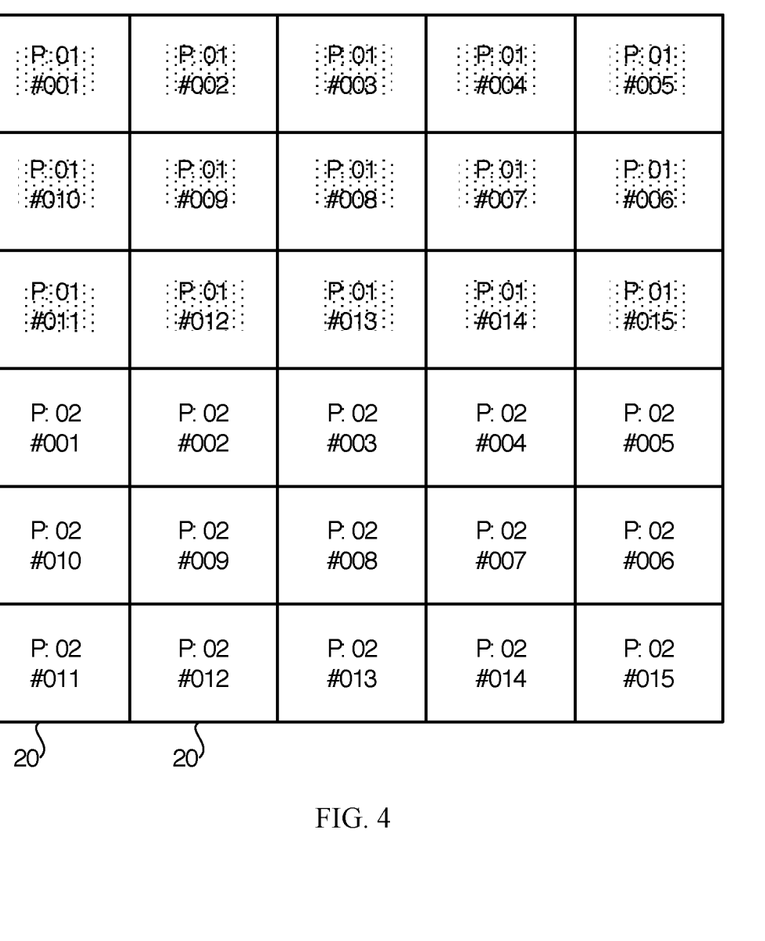
FIG. 4 is a schematic view showing target images of respective driven display areas under a display state, according to the first embodiment of the disclosure.
Figure 5:
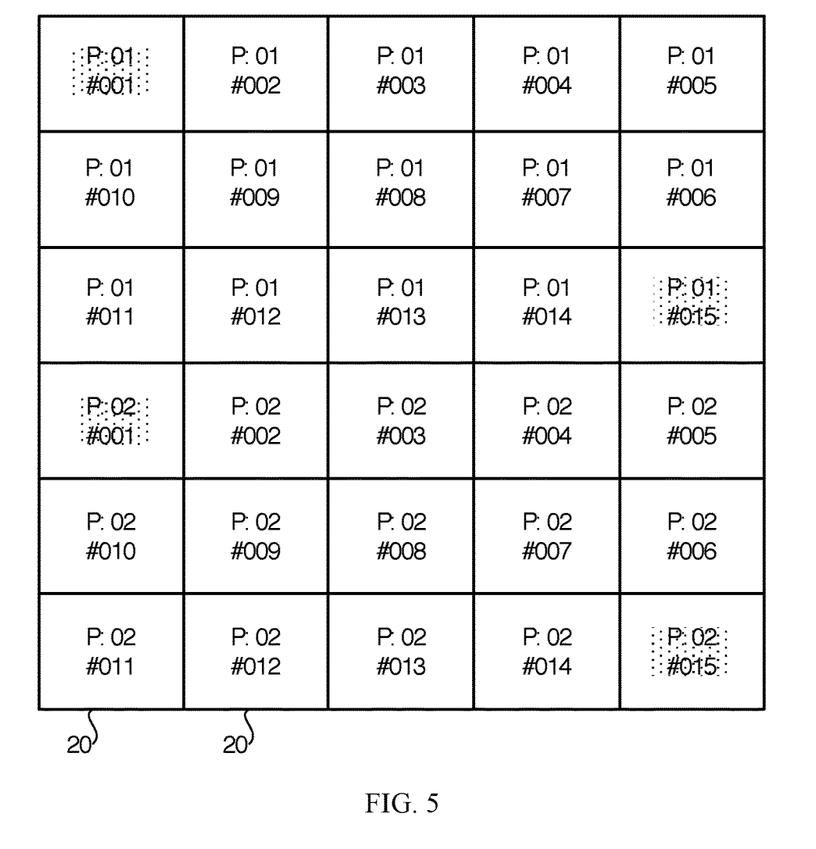
FIG. 5 is a schematic view showing target images of respective driven display areas under another display state, according to the first embodiment of the disclosure.

Further, in addition to the black and white display, the pixels of the configuration information image may also be marked by selecting different display color according to different number of the driving port such as the network port, for example, the network port 1 displays red, the network port 2 displays green, the network port 3 displays blue, etc. It is just need to modify the actual use data 32'hffffffff to be 32'h000000ff, 32'h0000ff00, and 32'h00ff0000 respectively, thereby achieving the configuration information images corresponding to the network port 1, the network port 2 and the network port 3 are respectively displayed in red, green, and blue. For example, the configuration information image of the driven display area 20 of each receiving card driven by the network port 1 in FIG. 4 is color-coded. Similar color distinction can be made to the configuration information image of the receiving card that needs special mark for each network port. For example, the configuration information images of the first and last receiving cards of each network port can be modified to marked color, by modifying the actual use data accordingly. For example, in FIG. 5, the configuration information images of the driven display area 20 of the first and last receiving cards are color-coded. In addition, in order to more easily distinguish the display area of each LED cabinet, a border can also be added to the background image, thereby to enhance user experience.

In summary, the embodiment controls the display device control card such as the receiving card, to generate and embed the configuration information image by issuing a configuration information display command, and finally displays the configuration information image on a display device such as an LED display device for observation by users. It provides a quick and effective solution for troubleshooting and engaging splicing units such as the LED cabinets to users, reduces users' cumbersome configuration work, reduces the technical threshold for the users to configure the splicing units, and improves the working efficiency of the technician. In addition, it is worth to mention that, in the case the splicing-type display device is carried/driven by a single port (e.g., a network port) of the display device controller, just the cascading serial number may be displayed in the configuration information image, and the driving port information such as the network port information may not be displayed.

Embodiment 2

Figure 6:
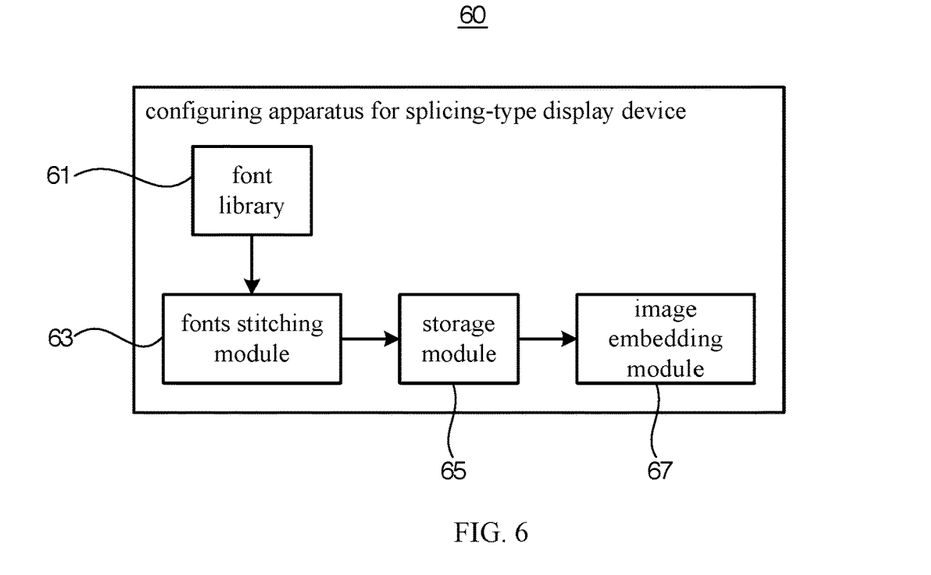
FIG. 6 is a block diagram of a configuring apparatus for a splicing-type display device according to a second embodiment of the disclosure.

Referring to FIG. 6, a second embodiment of the disclosure provides a configuration device 60 for a splicing-type display device, the configuration device 60 includes a font library 61, a fonts stitching module 63, a storage module 65, and an image embedding module 67.

Figure 3:
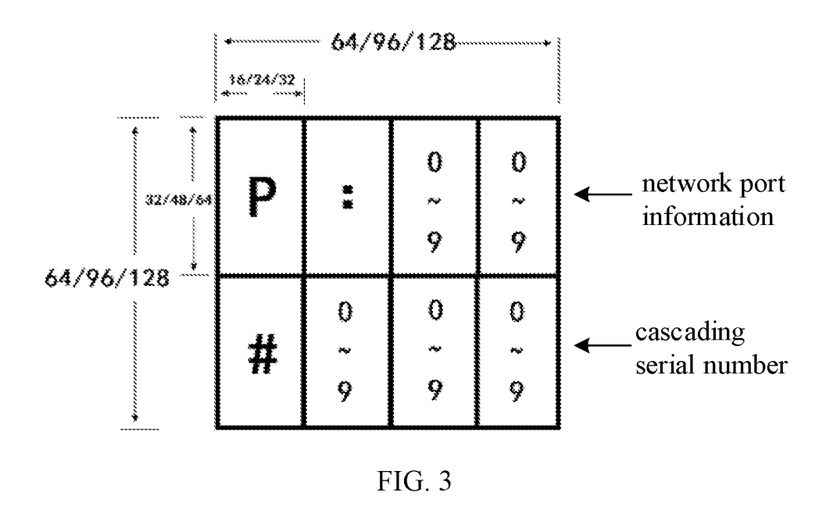
FIG. 3 is a schematic view showing a representing manner of network port information and a cascading serial number of the first embodiment of the disclosure.

The font library 61 stores, for example, fonts of "P", ":", "#", and numbers 0-9, etc., as shown in FIG. 3. It is typically located in a non-volatile memory of a display device control card such as a receiving card, thereby capable of being invoked by a programmable logic device such as an FPGA device of the receiving card.

The fonts stitching module 63 is configured (i.e., structured and arranged) for extracting fonts from the font library 61 to perform stitching operation, according to the configuration information, so as to obtain a configuration information image. The configuration information includes driving port information and a cascading serial number, and the configuration information image includes the driving port information and the cascading serial number.

The storage module 65 is configured for storing the configuration information image, for example, the configuration information image is stored in a volatile memory of the receiving card.

The image embedding module 67 is configured for embedding the stored configuration information image into a background image corresponding to a driven display area to obtain a target image.

The fonts stitching module 63, the storage module 65, and the image embedding module 67 of the disclosure may be software modules stored in a memory on the receiving card and executed by a programmable logic device. Details of the specific functions of the modules 63, 65, and 67 can be referred to the related descriptions of steps S13, S15, and S17 in the foregoing first embodiment, and details are not described herein again.

Figure 7:
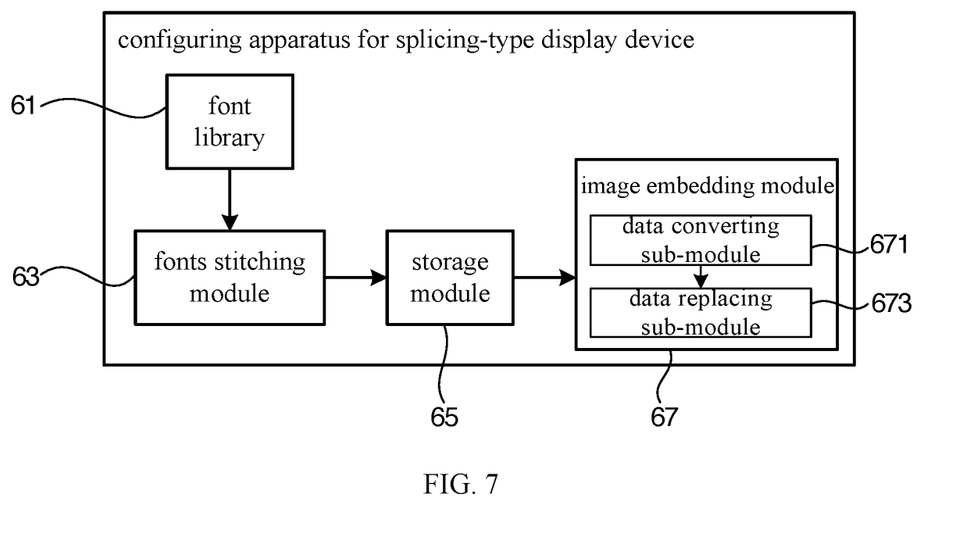
FIG. 7 is a block diagram of a configuring apparatus for a splicing-type display device according to another embodiment of the disclosure.

In an alternative embodiment, as shown in FIG. 7, the image embedding module 67 further includes a data converting sub-module 671 and a data replacing sub-module 673. The data converting sub-module 671 is configured for changing a bit number of the image data of each pixel in the configuration information image. For example, the stored pixel image data 1'b1 is changed to actual use data 32'hffffffff, the stored pixel image data 1'b0 is changed to actual use data 32'h00000000. The data replacing sub-module 673 is configured for replacing data in a local area of the background image by the image data with changed bit number of each pixel in the configuration information image, thereby obtaining data of the target image.

Figure 8:
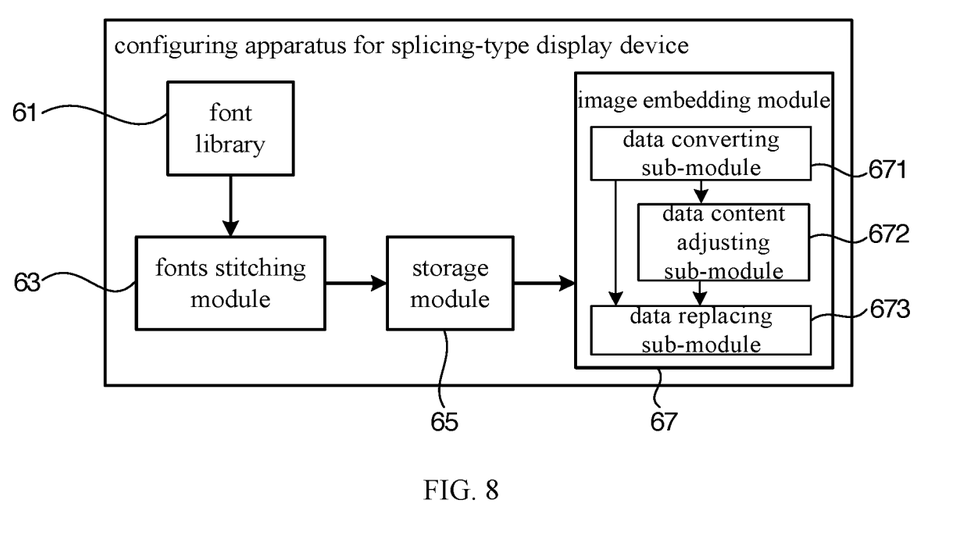
FIG. 8 is a block diagram of a configuring apparatus for a splicing-type display device according to still another embodiment of the disclosure.

In an alternative embodiment, as shown in FIG. 8, the image embedding module 67 further includes a data converting sub-module 671, a data content adjusting sub-module 672, and a data replacing sub-module 673. The data converting sub-module 671 is configured for changing a bit number of the image data of each pixel in the configuration information image, for example, changing the stored pixel image data 1'b1 to actual use data 32'hffffffff, changing the stored pixel image data 1'b0 to actual use data 32'h00000000. The data content adjusting sub-module 672 is configured for adjusting the content of the image data with changed bit number of each pixel point of the configuration information image. For example, actual use data 32'hffffffff can be modified to 32'h000000ff, 32'h0000ff00, or 32'h00ff0000. The data replacing sub-module 673 is configured for replacing data in a local area of the background image by the image data with changed bit number of each pixel in the configuration information image, thereby obtaining data of the target image; or is configured for replacing data in a local area of the background image by the image data with adjusted content of each pixel point in the configuration information image, thereby obtaining data of the target image.

The configuring apparatus for a splicing-type display device of the embodiment can perform a fast and convenient configuring method for a splicing-type display device, which provides a more convenient and more intuitive connection routing for the display device on aspects of configuration and connection to users, so that it can reduce working time and improve working efficiency when installing, configuring, and troubleshooting the splicing units.

Embodiment 3

Figure 9:
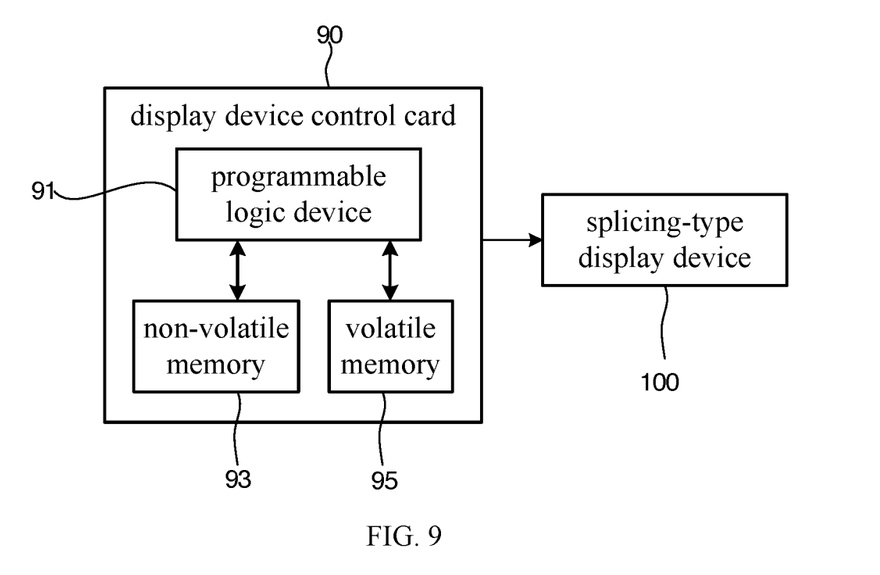
FIG. 9 is a structural schematic view of a display device control card according to a third embodiment of the disclosure.

Referring to FIG. 9, a third embodiment of the disclosure provides a display device control card 90, which is adapted for a splicing-type display device 100 such as an LED display device including a number of LED cabinets spliced together. The display device control card 90 is configured to execute the configuring method of a splicing-type display device as described in the foregoing first embodiment. Specifically, as shown in FIG. 9, the display device control card 90 includes, for example, a programmable logic device 91, a non-volatile memory 93, and a volatile memory 95. The non-volatile memory 93 and the volatile memory 95 are individually connected to the programmable logic device 91 such as an FPGA device. Steps S11, S13, S15, S17, and S19 in the foregoing first embodiment are performed, for example, by the programmable logic device 91. Fonts are extracted, for example, from a font library pre-stored in the non-volatile memory 93. A configuration information image is stored, for example, in the volatile memory 95 such as a RAM.

The display device control card of the embodiment e.g., a receiving card can perform a fast and convenient configuring method for a splicing-type display device, which provides a more convenient and more intuitive connection routing for the display device on aspects of configuration and connection to users, so that it can reduce working time and improve working efficiency when installing, configuring and troubleshooting the splicing units.

In the embodiments of the disclosure, it should be understood that the disclosed systems, devices, and/or methods may be implemented in other ways. For example, the device described above is merely illustrative. For example, the division of the modules is only a logical function division. In actual implementation, there may be another division manner, for example, multiple units or components may be combined or integrated into another system, or some features can be ignored or not executed. In addition, the coupling, direct coupling or communication connection as shown or discussed may through some interface, device or unit, and further may be in electrical, mechanical or otherwise.

The units described as separate components maybe or maybe not physically separated, and the components illustrated as units maybe or maybe not physical units, that is, may be located in one place, or may be distributed to multiple network units. Some or all of the units may be selected according to actual needs to achieve the purposes of the solutions of the embodiments.

In addition, each functional unit in various embodiments of the disclosure may be integrated into one processing unit, or each unit may be physically separated, or two or more units may be integrated into one unit. The above integrated unit can be implemented in a form of hardware or in a form of hardware plus a software functional unit(s).

The above-described integrated unit implemented in the form of a software functional unit(s) can be stored in a computer readable storage medium. The above software functional unit is stored in a storage medium and includes instructions for causing one or more processors of a computer device (which may be a personal computer, a server, or a network device, etc.) to perform some steps of the methods described in various embodiments of the disclosure. The foregoing storage medium may be: a U disk, a mobile hard disk, a read-only memory (ROM), a random access memory (RAM), a magnetic disk, an optical disk, or the like medium that program codes can be stored thereon.

Finally, it should be noted that the above embodiments are only for exemplary illustrating the technical solutions of the disclosure, but not intended for limiting the disclosure; although the disclosure has been described in detail with reference to the foregoing embodiments, for the person skilled in the art of the disclosure, it should be understood that the technical solutions described in the foregoing embodiments may be modified, or some of the technical features may be equivalently substituted; and these modifications or substitutions do not make the essences of corresponding technical solutions deviate from the spirit and scope of the technical solutions of the embodiments of the disclosure.

What is claimed is:

1. A configuring method for a splicing-type display device, comprising:
    receiving a configuration information display command;
    in response to the configuration information display command, extracting fonts from a font library according to configuration information and stitching the extracted fonts to thereby generate a configuration information image, wherein the configuration information comprises driving port information and a cascading serial number, and the configuration information image at least comprises the cascading serial number;
    storing the configuration information image;
    embedding the stored configuration information image into a background image corresponding to a driven display area to thereby obtain a target image; and
    displaying the target image in the driven display area.

2. The configuring method for a splicing-type display device according to claim 1, wherein extracting fonts from a font library according to configuration information and stitching the extracted fonts to thereby generate a configuration information image comprise:
    performing a stitching operation on a plurality of extracted fonts in a line-by-line manner.

3. The configuring method for a splicing-type display device according to claim 1, wherein embedding the stored configuration information image into a background image corresponding to a driven display area to thereby obtain a target image comprises:
    replacing data in a local area of the background image by data of the configuration information image to thereby obtain data of the target image.

4. The configuring method for a splicing-type display device according to claim 3, wherein replacing data in a local area of the background image by data of the configuration information image to thereby obtain data of the target image comprises:
    changing a bit number of an image data of each pixel in the configuration information image.

5. The configuring method for a splicing-type display device according to claim 4, wherein replacing data in a local area of the background image by data of the configuration information image to thereby obtain data of the target image further comprises:
    adjusting content of the image data with changed bit number, of each pixel in the configuration information image.

6. The configuring method for a splicing-type display device according to claim 1, wherein a resolution of the configuration information image is one selected from preset resolutions, and the preset resolutions comprise 64*64, 96*96, and 128*128.

7. The configuring method for a splicing-type display device according to claim 1, wherein the configuration information image further comprises the driving port information and a resolution of the driven display area.

8. The configuring method for a splicing-type display device according to claim 1, wherein the background image is a pre-stored monochrome image or pure color image.

9. A display device control card, adapted for connecting with a splicing-type display device; wherein the display device control card is configured for executing the configuring method for a splicing-type display device according to claim 1.

10. A configuring apparatus for a splicing-type display device, comprising:
    a font library;
    a fonts stitching module, configured to extract fonts from the font library according to configuration information and stitch the extracted fonts to thereby generate a configuration information image, wherein the configuration information comprises driving port information and a cascading serial number, and the configuration information image at least comprises the cascading serial number;
    a storage module, configured to store the configuration information image; and
    an image embedding module, configured to embed the stored configuration information image into a background image corresponding to a driven display area to thereby obtain a target image;
    wherein the fonts stitching module, the storage module and the image embedding module are software modules stored in a memory and executable by a programmable logic device.

11. The configuring apparatus for a splicing-type display device according to claim 10, wherein the image embedding module comprises a data converting sub-module and a data replacing sub-module;
    the data converting sub-module is configured to change a bit number of an image data of each pixel in the configuration information image; and
    the data replacing sub-module is configured to replace data in a local area of the background image by the image data with changed bit number of each pixel in the configuration information image, to thereby obtain data of the target image.

12. The configuring apparatus for a splicing-type display device according to claim 10, wherein the image embedding module comprises a data replacing sub-module and at least one of a data converting sub-module and a data content adjusting sub-module;

the data converting sub-module is configured to change a bit number of an image data of each pixel in the configuration information image;

the data content adjusting sub-module is configured to adjust content of the image data with changed bit number of each pixel in the configuration information image; and     the data replacing sub-module is configured to replace data in a local area of the background image by the image data with the changed bit number of each pixel in the configuration information image to thereby obtain data of the target image; or     configured to replace data in a local area of the background image by the image data with adjusted content of each pixel in the configuration information image, to thereby obtain data of the target image.

13. The configuring apparatus for a splicing-type display device according to claim 10, wherein the configuration information image further comprises the driving port information and a resolution of the driven display area.

14. The configuring apparatus for a splicing-type display device according to claim 10, wherein the fonts splicing module is configured to perform a stitching operation on a plurality of extracted fonts in a line-by-line manner.

15. The configuring apparatus for a splicing-type display device according to claim 10, wherein the storage module is configured to store an image data represented by one bit of each pixel of the configuration information image.

* * * * *